H. Loewenberg.
Fabrics for Hats.
Nº 36097        Patented Aug. 5, 1862.
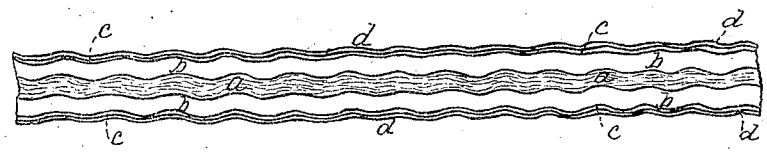
Witnesses
Inventor
Henry Loewenberg.

UNITED STATES PATENT OFFICE.

HENRY LOEWENBERG, OF BOSTON, MASSACHUSETTS.

IMPROVED FABRIC FOR HATS AND BONNETS.

Specification forming part of Letters Patent No. 36,097, dated August 5, 1862.

*To all whom it may concern:*

Be it known that I, HENRY LOEWENBERG, a native of Prussia, but now residing in Boston, in the county of Suffolk and State of Massachusetts, United States of America, have invented a new and useful or Improved Article of Manufacture to be used for Making Hats as well as for other Purposes; and I do hereby declare the same to be fully described in the following specification.

In carrying out my invention I take a thin cloth and cement to each of the opposite sides of it a layer of paper. On the external surface of one or both of these layers of paper I spread a layer of a solution of starch. Next, on such starch, and when dry, I spread one or more layers of copal or other varnish. After the varnish may have become set so as to be nearly dry the whole is to be embossed in imitation of braided straw.

In preparing the embossing plate or mold I adopt the electrotype process. By means of a suitable composition I take an impression of the braided straw to be imitated, whether such be the crown-piece, the rim, or the body of a hat or bonnet. Next, from the latter a counter impression may be taken, whose surface, after having been dusted with powdered plumbago, may be placed in an electrotyping-bath and have a coating of metal thrown down upon it. This coating of metal, when backed with metal and prepared in a manner well understood by those who make electrotyped stamps for bookbinder's work, will answer for stamping or embossing the starched and varnished combined fabric, as specified. The embossing is to be effected by pressure of the mold and the starched and varnished paper and cloth together firmly in a powerful press, the layer of varnish being next to the mold.

The cloth prevents the manufacture from being easily torn, particularly in the seaming or parts of it where portions of it may be sewed together. The starch not only serves to stiffen the combined fabrics, but enables them to properly receive the varnish, which renders the whole water-proof and capable of being washed, and after the embossing process has been carried on imparts to the whole surface on which it may be the glossy appearance of common straw, provided the paper used in my said manufacture be first stained or colored a straw color.

The accompanying drawing illustrates a section of the material as combined, and shows the different layers of cloth, starch, and varnish, $a$ being the cloth, $b$ the paper, $c$ the starch, and $d$ the varnish.

My invention is peculiarly useful for the fabrication of hats or bonnets for ladies, as a hat or bonnet made of it has all the appearance of one made of braided straw, and besides is more durable and not so liable to injury by being wet. It is also much cheaper than braided straw.

I do not claim paper or card board stamped or embossed in imitation of braided straw; nor do I claim sizing and varnishing an article; but

I claim—

My above-described new or improved manufacture of hat or bonnet fabric as made of the materials and in the manner substantially as hereinbefore explained.

HENRY LOEWENBERG.

Witnesses:
R. H. EDDY,
F. P. HALE, Jr.